Nov. 13, 1923.　　　　　　　　　　　　　　　　　　　1,474,163
J. E. REBOURS
VEHICLE
Filed Oct. 21, 1921　　　　6 Sheets-Sheet 1
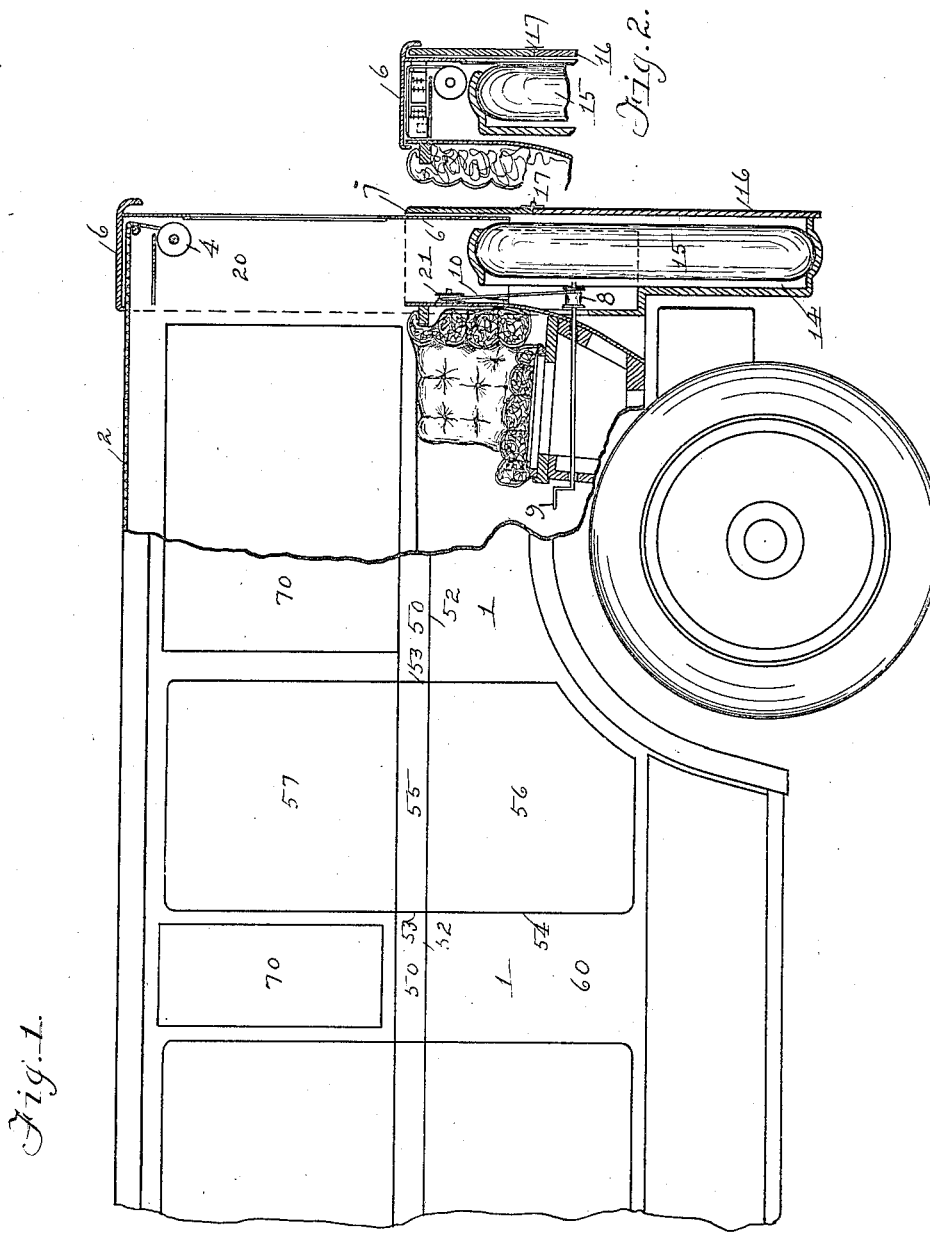

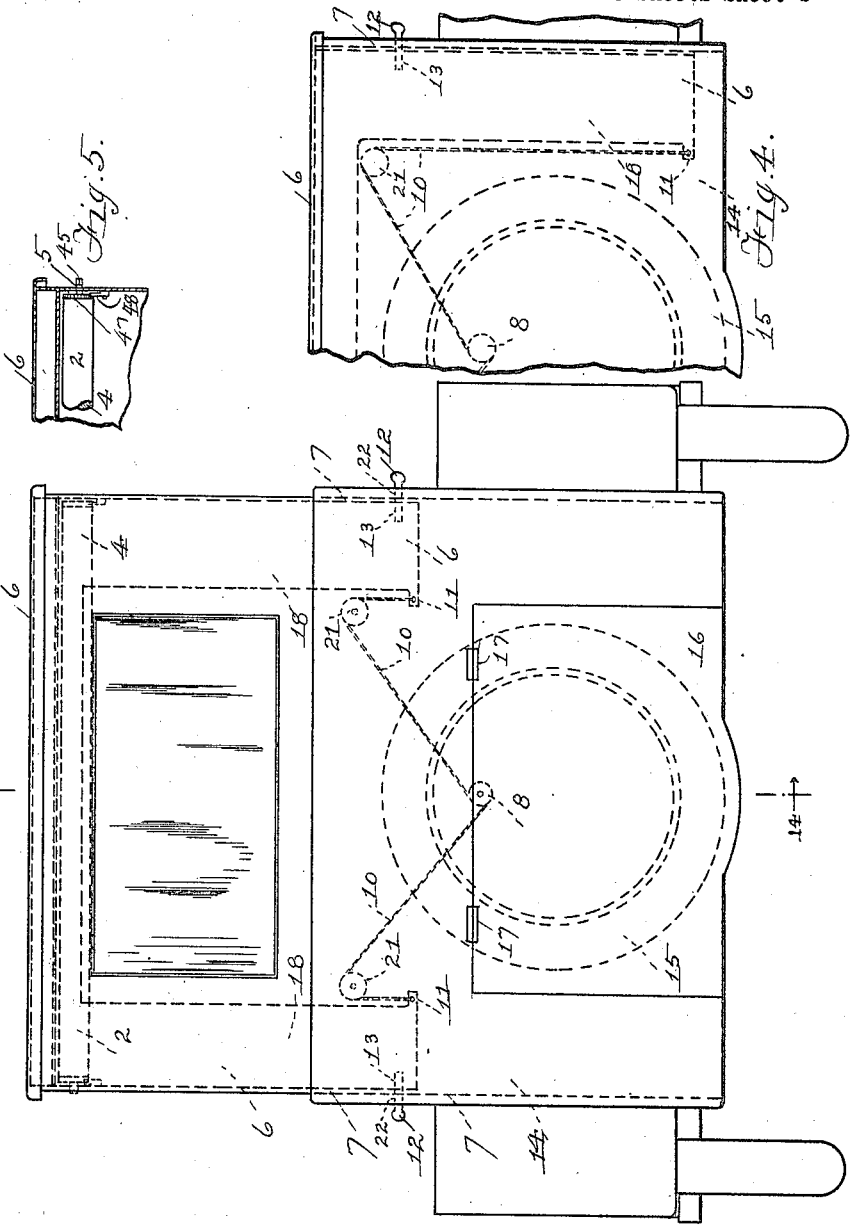

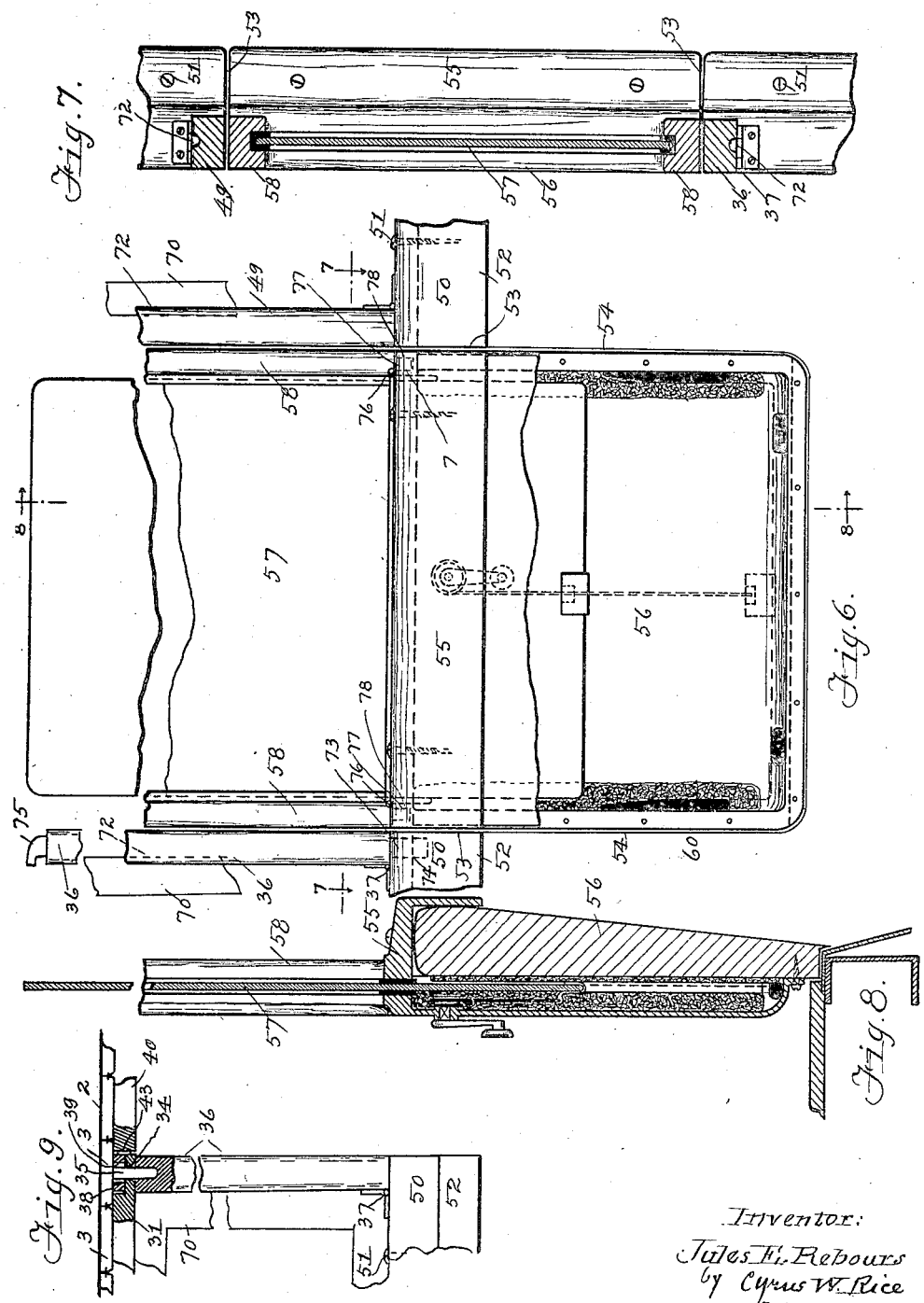

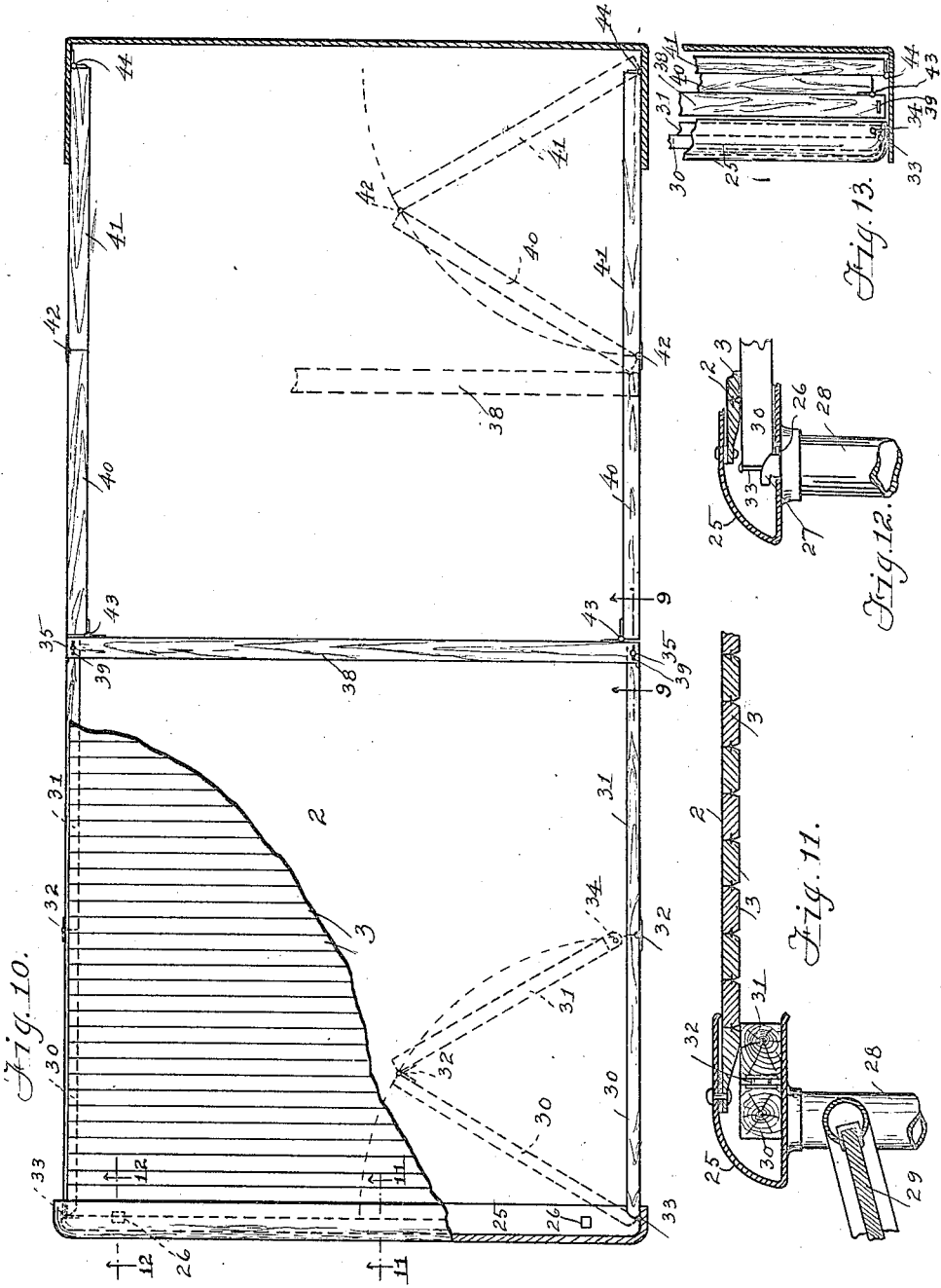

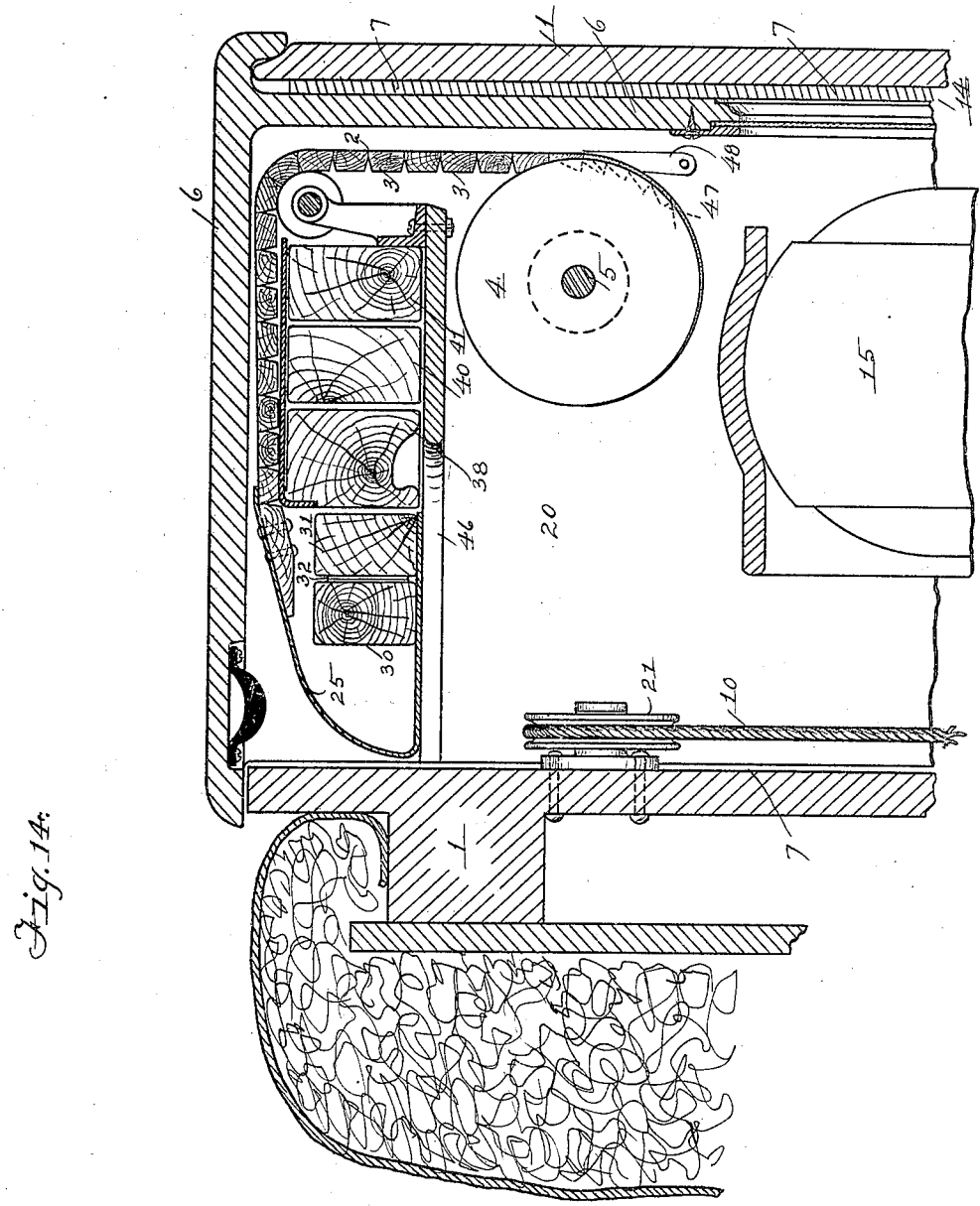

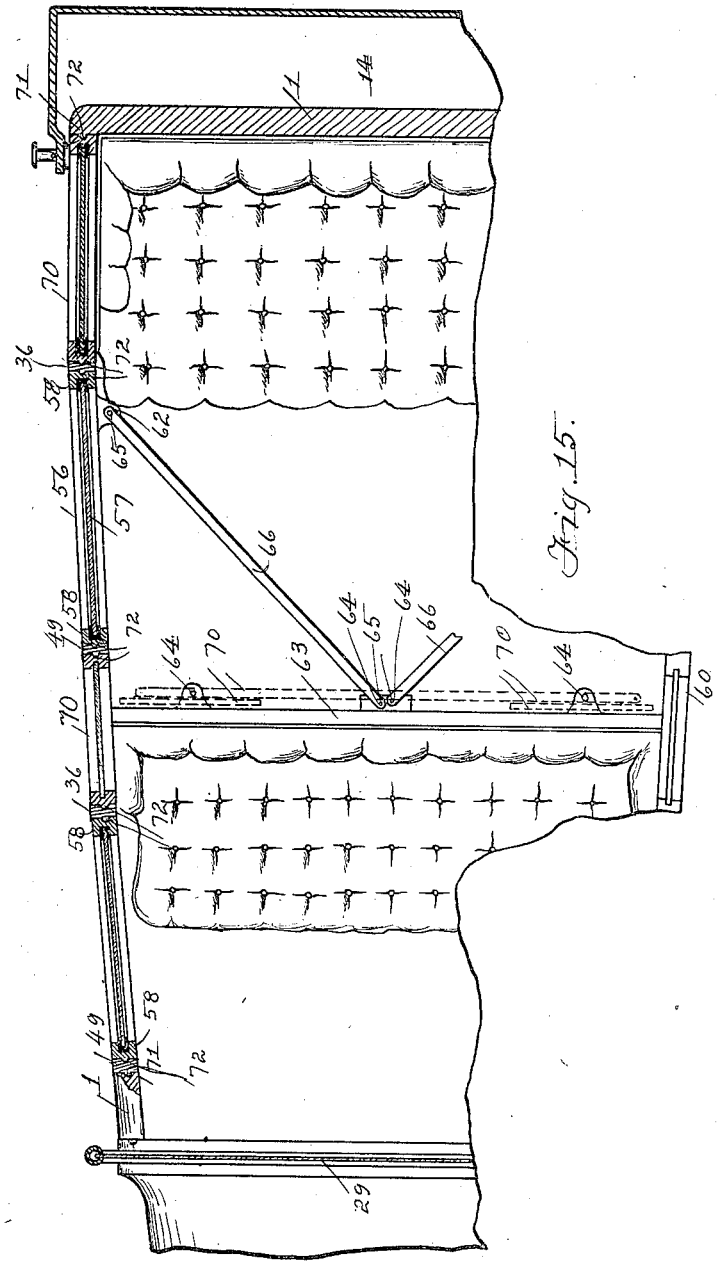

Patented Nov. 13, 1923.

1,474,163

UNITED STATES PATENT OFFICE.

JULES E. REBOURS, OF GRAND RAPIDS, MICHIGAN.

VEHICLE.

Application filed October 21, 1921. Serial No. 509,246.

*To all whom it may concern:*

Be it known that I, JULES E. REBOURS, a citizen of the United States, residing at Grand Rapids, in the county of Kent and State of Michigan, have invented new and useful Improvements in Vehicles, of which the following is a specification.

The present invention relates to vehicles; and an object thereof is, generally, to provide an improved "top" for a vehicle; a further object is to provide improved means for raising and lowering the top of a vehicle; a further object is to provide improved means for supporting the top of a vehicle above the body thereof; a further object is to provide in connection with the top raising and lowering means a convenient chamber for containing a "spare" wheel or tire for the vehicle, so arranged that space may be economized; a further object is to provide a frame attachable to the body of a vehicle and carrying the top and top-raising means; a further object is to provide a wind shield which may be held in various positions as may be desired.

These and any other objects hereinafter appearing are attained by, and the invention finds preferable embodiment in, the structure hereinafter particularly described in the body of this specification and illustrated by the accompanying drawings, in which:—

Figure 1 is a side view of part of an automobile, the rear portion thereof being shown in vertical section;

Figure 2 is a like sectional view of a fragment thereof, the top-carrying member being shown in lowered position;

Figure 3 is a rear view of the automobile;

Figure 4 is a like view of a portion thereof, the top-carrying member being shown in lowered position;

Figure 5 is a view of parts of the same, vertically sectioned on the axis of the roller on which the flexible top is wound;

Figure 6 is a side view of a portion of the automobile including a door thereof;

Figure 7 is a sectional view of the same taken on a horizontal plane corresponding to line 7—7 of Figure 6;

Figure 8 is a sectional view of the same taken on a vertical plane corresponding to line 8—8 of Figure 6;

Figure 9 is a side view of certain parts of the same and of the top-supporting means, partially sectioned on a vertical plane corresponding to line 9—9 of Figure 10;

Figure 10 is a top plan view of the top of the automobile, parts thereof being broken away;

Figure 11 is a sectional view of the forward part of the automobile's top, taken on a vertical plane corresponding to line 11—11 of Figure 10 (and much enlarged), the top-supporting side ribs being folded together;

Figure 12 is a like view of the forward part of said top taken on line 12—12 of Figure 10;

Figure 13 is a top plan view of portions of the top's supporting ribs folded together;

Figure 14 is a much enlarged sectional view of a part of the rear portion of the automobile, taken on a vertical plane corresponding to line 14—14 of Figure 3; and Figure 15 is a sectional view of a portion of the automobile taken on a horizontal plane just above the seats.

In the embodiment of the invention chosen for illustration by the drawings and for detailed description in the body of this specification, my invention is shown applied to a vehicle—an automobile—having the body portion designated generally 1. This body carries the automobile's top and means for raising and lowering the same, the top being a flexible sheet 2 which may be furnished with transversely-extending slats 3, as shown, for stiffening it. This flexible top is carried by and is rollable on a roller 4 rotatably-mounted at 5 in a chamber 20 in a member 6 adapted to be raised and lowered relatively to the body 1, as in suitable upwardly-extending guides 7 carried by the body. This member may be thus raised and lowered and held in raised position by any suitable means, as by the windlass 8 turned by the hand crank 9 and having cords 10 wound thereon and over pulleys 21 and attached to said member 6 at 11. The windlass may have a ratchet wheel and detent (not shown) to hold the member 6 in raised position; or other means to this end may be employed, as the bolts 12 slidable in bearings 22 on the body and adapted to be slid into sockets 13 in the member 6 (see Figures 1 and 3).

The body 1 of the automobile has at its rear portion, as shown, a chamber 14 in which the member 6 is raised and lowered, said chamber being adapted to contain a "spare" wheel or tire 15, which may be inserted and removed through a door 16 hinged at 17. The spaced-apart portions 18 of the member 6 (which portions are guided in the guides 7) are in straddling relation to this tire 15 as particularly seen in Figures 3 and 4, so that the space provided in said chamber 14 is utilized to accommodate not only the lowered member 6 but also this spare wheel or tire 15.

The top is supported in extended position over the body 1 by suitable means, preferably the following: The free or forward end of the flexible top has a cross rib 25 (see Figures 10, 11 and 12) provided with openings 26 into which the hooks 27 carried at the upper ends of the supports 28 of the windshield 29 at the fore part of the automobile, are adapted to be removably inserted as seen in Figure 12. A pair of side ribs 30, 31 at each side of the top are pivotally connected at 32, and one of them 30 is pivotally connected at 33 to said front cross rib 25 and the other side rib 31 has a socket 34 into which the pin 35 carried at the upper end of the arm 36 is adapted to be inserted, this arm being hingedly mounted at 37 on the side wall of the automobile. Another cross rib 38 is supported at either end by the upper end of the arm 36, the said pin 35 entering a socket 39 therein. A second pair of side ribs 40, 41 at each side of the top are pivotally connected at 42, and one of them 40 is pivotally connected at 43 to said cross rib 38, the other side rib 41 being pivotally connected at 44 to the member 6. When the top is to be lowered, it is wound or rolled on the roller 4, as by applying a suitable wrench or key to the squared end 45 of its shaft, and the cross ribs and side ribs are folded into parallel relation with each other, as seen in Figure 13, and pushed into the chamber 20 in the member 6, as particularly seen in Figure 14, the roller being perferably held against unrolling by its ratchet 47 held by detent 48. A plurality of cross ribs similar to 38 and a plurality of arms similar to 36, as seen at 49 in Figures 6 and 7, may be provided.

Instead of the chamber 14 (which contains the spare tire and in which the member 6 is raised and lowered) being formed in the body 1 itself of the vehicle, and instead of the arms 36, 49 being mounted directly on said body, such chamber may be formed in, and said arms may be carried by, a suitable frame designated generally 50, adapted to rest on the upper edges of the side walls 60 and rear end of the vehicle's body, and to be detachably connected thereto in any suitable way, as by screws 51 (Figures 6 and 7), so that my top carrying, raising and supporting mechanism may be readily applied to vehicles and readily detached therefrom. This frame 50 is desirably provided with flanges 52 engaging the side walls for securely holding the frame in place. This frame is interrupted by an opening 53 registering with the door opening 54 in the side wall of the body, the top-supporting arms 36, 49 being mounted at either side of the frame's opening 53, as seen in Figures 6 and 7. A flanged member 55, similar in cross section to the portions of the frame 50 at opposite sides of the door opening, is secured to the door 56 and carries the window 57 slidable vertically in side members 58 carried by the member 55, as seen in Figures 6, 7 and 8. The side walls 60 or (doors 56 therein) may be provided with sockets 62, and a transverse portion 63 of the body may be provided with sockets 64, so that the vertically extending pins 65 of the windshield 66 may be inserted into a side wall's socket 62 and into a socket 64 of the transverse portion 63 to hold the shield edge up in one position (shown in solid lines in Figure 15), or both pins 65 may be inserted into the sockets 64 to hold the windshield in another edge-up position shown in dotted lines in said figure.

The windows 70 (other than those in the doors) may be made removable, when the automobile's top is lowered, by their sashes and their supporting members extending upwardly from the frame 50—as such members 71, and the arms 36, 49—being interrelatively tongued and grooved at 72 as seen in Figures 6 and 15.

The upwardly-extending arms 36, 49, instead of being hingedly mounted as shown, may have pins 73 adapted to be inserted into sockets 74 in the frame or body, as seen in Figure 6; and the upper end of these arms may be provided with hooks 75 similar to the hook 27, so that they may be inserted into the sockets 26 of the front rib 25 when it is desired to cover only the rear portion of the automobile by the top. (See Figure 6.) The door-window's supports 58 may be hingedly mounted at 76 or attached by pins 77 entering sockets 78.

The invention being intended to be pointed out in the claims, is not to be limited to or by details of construction of the particular embodiment thereof illustrated by the drawings or hereinbefore described.

I claim:

1. In a vehicle; a body having at its rear portion a chamber adapted to contain a tire and having upwardly-extending guides; a member having a rotatably-mounted roller and spaced-apart portions movable upwardly and downwardly in the guides in straddling relation with a tire in said chamber; a flexible top rollable on the roller; means carried by the body for supporting the top in extended position above the body.

2. In a vehicle; a body having side walls; a frame detachably connected to the side walls and comprising a rear portion and a member adapted to be raised and lowered thereon and having a rotatably-mounted roller; a flexible top rollable on the roller; means carried by the body for supporting the top in extended position above the body.

3. In a vehicle; a body having side walls with a door opening therein; a frame detachably connected to the side walls and having an opening registering with the door opening, and comprising a rear portion and a member adapted to be raised and lowered thereon, said member having a rotatably-mounted roller; a flexible top rollable on the roller; an arm pivotally-mounted on the frame adjacent the frame's opening and adapted to be raised and lowered; a cross rib adapted to be detachably connected to the upper end of the raised arm for supporting the top in extended position above the body.

4. In a vehicle; a body having side walls with a door opening therein; a frame detachably connected to the side walls and having an opening registering with the door opening, and comprising a rear portion and a member adapted to be raised and lowered thereon, said member having a rotatably-mounted roller; a flexible top rollable on the roller; an arm pivotally-mounted on the frame adjacent the frame's opening and adapted to be raised and lowered; a window; the window and arm having means for detachably connecting them together.

In testimony whereof I have hereunto set my hand at Grand Rapids, Michigan, this 17th day of October, 1921.

JULES E. REBOURS.